(12) United States Patent
Walker et al.

(10) Patent No.: US 11,490,572 B2
(45) Date of Patent: Nov. 8, 2022

(54) MODULAR FLOATING STRUCTURE (71) Applicants: Chris Walker, Tonsley (AU); Terry Lucke, Tonsley (AU)

(72) Inventors: Chris Walker, Tonsley (AU); Terry Lucke, Tonsley (AU)

(*) Notice: Subject to any disclaimer, the term of this patent is extended or adjusted under 35 U.S.C. 154(b) by 0 days.

(21) Appl. No.: 15/733,137

(22) PCT Filed: Nov. 28, 2018

(86) PCT No.: PCT/AU2018/051264
§ 371 (c)(1),
(2) Date: May 27, 2020

(87) PCT Pub. No.: WO2019/104377
PCT Pub. Date: Jun. 6, 2019

(65) Prior Publication Data
US 2020/0383276 A1 Dec. 10, 2020

(30) Foreign Application Priority Data
Nov. 30, 2017 (AU) .................. 2017904830

(51) Int. Cl.
A01G 9/02 (2018.01)
B63B 35/44 (2006.01)
A01G 33/00 (2006.01)
B63B 7/00 (2020.01)

(52) U.S. Cl.
CPC .......... A01G 9/027 (2013.01); A01G 33/00 (2013.01); B63B 35/44 (2013.01); B63B 2007/006 (2013.01); B63B 2035/4493 (2013.01)

(58) Field of Classification Search
CPC ......... A01G 9/027; A01G 9/025; A01G 9/02; A01G 33/00; A01G 31/00; A01G 31/02; A01G 25/00; A01G 9/00; A01G 31/04; A01G 31/06; A01K 61/60; A01K 61/65; A01K 61/75; B63B 2035/4493; C02F 3/32; C02F 3/322; C02F 3/325; C02F 3/327

See application file for complete search history.

(56) References Cited

U.S. PATENT DOCUMENTS 7,448,163 B2 * 11/2008 Beeman .................. A01G 9/00
47/60
8,555,547 B2 10/2013 Hashimoto
8,641,893 B2 * 2/2014 Torres Junco .......... C02F 3/327
210/170.05

(Continued)

FOREIGN PATENT DOCUMENTS

CN 1973606 A 6/2007
CN 101003408 A 7/2007

(Continued)

OTHER PUBLICATIONS

KR20060027302 translation, retrieved from internet Nov. 6, 2020 (Year: 2006).*

(Continued)

Primary Examiner — Kristen C Hayes
(74) Attorney, Agent, or Firm — Barnes & Thornburg LLP (57) ABSTRACT A floating wetland structure including a plurality of floating connected modules, each module having a frame that is at least partially hollow and a support structure adapted to support a plurality of containers for growing plants in the wetland.

6 Claims, 12 Drawing Sheets (56) References Cited

U.S. PATENT DOCUMENTS

| | | | |
|---|---|---|---|
| 9,807,950 B2* | 11/2017 | Day | A01G 31/02 |
| 9,850,149 B2* | 12/2017 | Fulford | C02F 3/10 |
| 2004/0255513 A1* | 12/2004 | Becker | A01G 31/00 |
| | | | 47/65.9 |
| 2011/0259820 A1* | 10/2011 | Songer | C02F 3/327 |
| | | | 210/602 |
| 2012/0012516 A1* | 1/2012 | Torres Junco | A01G 9/12 |
| | | | 210/242.1 |
| 2012/0174480 A1* | 7/2012 | Riesco Prieto | A01G 9/00 |
| | | | 47/44 |
| 2013/0091767 A1* | 4/2013 | Riesco Prieto | A01G 31/02 |
| | | | 47/59 R |
| 2015/0144068 A1* | 5/2015 | Quinta Cortinas | A01K 61/00 |
| | | | 119/223 |
| 2016/0135396 A1* | 5/2016 | Day | A01G 31/02 |
| | | | 700/275 |

FOREIGN PATENT DOCUMENTS

| | | | |
|---|---|---|---|
| DE | 2905759 A1 | | 8/1980 |
| EP | 1955586 A1 | | 8/2008 |
| JP | 2004000052 A | | 1/2004 |
| KR | 20030075471 A | | 9/2003 |
| KR | 20060027302 A | | 3/2006 |
| KR | 20060027302 | * 10/2006 | C02T 3/32 |
| KR | 101273624 B1 | | 7/2013 |

OTHER PUBLICATIONS

International Search Report, issued in PCT/AU2018/051264, dated Jan. 29, 2019.

EESR issued in corresponding EP Application No. 18882313.2 dated Aug. 4, 2021.

Office Action issued in corresponding CN Application No. 201880076880.7, dated Aug. 26, 2021.

* cited by examiner

MODULAR FLOATING STRUCTURE

This application is a National Stage application of International Application No. PCT/AU2018/051264, filed Nov. 28, 2018 and this application also claims priority under 35 U.S.C. § 119 to Australian Patent Application No. 2017904830, filed Nov. 30, 2017, which are incorporated by reference herein in their entirety.

TECHNICAL FIELD

The present invention relates to a floating wetland structure that can be used to deploy and grow plants on a body of water to, for example, treat stormwater or wastewater and improve water quality.

BACKGROUND OF INVENTION

Wetlands perform vital ecological functions in cleaning and purifying water by trapping sediments and removing excess nutrients and other pollutants, some of which are taken up and stored by wetland plants. Up take of nutrients may occur through the roots, stems and leaves of the plant, and are then utilised for growth, with some concentrations stored until the plant dies or is harvested. Excess nutrients may also be removed by bacterial action on the surface of the plant and plant roots in a process of bioremediation. Microbes on the surface of the plant and plant roots form a biofilm that breaks down pollutants in the water into less harmful substances.

In addition to their water cleansing function, wetlands also provide a habitat for many species of birds, fish, reptiles, amphibians and invertebrates. Wildlife may rely on wetlands for food, shelter and protection. Other benefits of wetlands include providing a measure of flood protection and stabilising shorelines against erosive forces.

Because of the recognised environmental benefits of these natural wetlands, artificial wetland islands have been constructed and used to manage and filter stormwater or wastewater including sewage, agricultural and industrial effluent. For example, floating wetland islands made of recycled plastic products and/or foams have been constructed and wetland plants planted in organic matter placed on top of the island. Plastics may be recycled from drink bottles or other post-consumer products and formed into a matrix with foam, to provide buoyancy to the island.

EP 2468088 describes a floating island that has a body comprising one or more layers of water-permeable nonwoven plastic mesh material. The buoyancy of the island body is achieved initially by means of injection of expanding foam to create nodules. However, it is only possible to increase the buoyancy of the floating island through this process. The floating island matrix provides a surface area for growing large amounts of microbes (a biofilm) for breaking down nutrients and other pollutants.

Challenges when deploying wetland islands include construction and installation of the island, maintaining flotation of the island over time as wetland plants grow larger and heavier, replacing aquatic plants that have reached the end of their useful life, plant roots becoming entangled with the structure of the island, and withstanding weather conditions over the long term. Further, in the example where the floating island is made of recycled plastic products, the plastic may degrade and pollute the waterway by, for example, depositing micro-plastics in the waterway. Further still, challenges exist in maintaining the wetland islands such as providing safe access for maintenance personnel.

It would be desirable to provide a floating wetland structure that ameliorates or addresses one or more of these challenges and provides advantages over known constructed, artificial floating wetlands.

SUMMARY OF INVENTION

According to one aspect, the present invention provides a floating wetland structure including a plurality of floating connected modules, each module having a frame that is at least partially hollow and a support structure adapted to support a plurality of containers for growing plants in the wetland.

The modular design of the floating wetland structure enables the structure to be easily constructed by connecting a plurality of modules together. Modules may be connected in different configurations in order to provide different size or shape wetland structures, as required for a given application. Any number of modules may be used, depending on the intended application and the size of the body of water to be treated. This enables flexible design options and ease of future expansion of the floating wetland structure.

The support structure of the present invention enables containers for growing plants in the wetland to be removed or exchanged without the need for totally replacing the wetland structure. For example, containers holding older plants may be removed before the plants die and release their nutrients into the water, and replaced with containers of fresh plants. Containers of plants may also be replaced with containers of other species of plants which are better suited to removing particular water contaminants or in some applications for aesthetic purposes. Further, containers may be moved to different positions within the floating wetland structure or removed from the body of water for a period of time, for example to facilitate their care and maintenance.

In an embodiment, containers for growing plants in the wetland may be supported wholly by the support structure. In another embodiment, containers for growing plants in the wetland may be supported by the frame in combination with the support structure. In yet another embodiment, one or more containers of the plurality of containers may be supported wholly by the support structure and one or more other containers may be supported by the frame in combination with the support structure. The support structure being adapted to support a plurality of containers is to be understood to cover all of these embodiments.

Any appropriate plant may be used in conjunction with the containers. For example, plants may be grown hydroponically with their roots supported by a growing medium such as scoria or gravel and exposed to water below the container. Suitable plants include typical wetland species, but the modules are not limited to using these types of plants and a broader range of plant species may be used.

The frame of each module may be an outer frame and the support structure may be an inner support structure within the outer frame. This configuration may provide greater stability to the floating module. The outer frame, being at least partially hollow, may have greater buoyancy than the inner support structure. In other examples, the support structure may extend beyond the limits of the frame. For example, the support structure may be positioned both within the frame and around the frame. In yet other embodiments, the support structure may also be at least partially hollow.

Each module may include an opening to allow the controlled ingress of fluid (e.g. water) into the frame. This feature may enable the buoyancy of the module to be regulated. For example, the frame (and in some embodiments, the support structure) may be filled with water via the opening in order to reduce the buoyancy of the module. This may be useful when the floating wetland is first planted when the weight of the plants is less (or when the modules are being used for other, non-vegetated uses), and to potentially assist the structure to withstand adverse weather conditions. Water may then be removed via the opening to increase the buoyancy of the module as required over time, for example as the plants grow and increase in weight. The buoyancy of the module may thus be regulated both positively and negatively, to allow for greater or lesser loading of the floating modular structure as required. The opening may be fitted with a vandal proof screw cap, plug or other seal and opened and closed as required.

In an embodiment, the frame of each module includes a plurality of hollow beams. For example, the frame of each module may include four hollow beams. In this example, the module may be conveniently formed in a square or rectangular shape. Alternatively, the frame may be made from some hollow and some solid beams, or from three, five, six or more beams. In some embodiments, the support structure may also include hollow beams, spanning from one beam of the frame to another or in a grid arrangement. The hollow beams of the support structure may be positioned between containers supported by the support structure, or above and or below the containers supported by the support structure.

The configuration of buoyant hollow beams may increase the stability of the module and of the overall floating wetland structure when the modules are connected together. When the modules are connected, they may effectively form a buoyant grid or other geometrical structure across the floating wetland.

Where the module includes a plurality of hollow beams, each beam may include an opening to allow ingress of fluid into the beam. This may allow the buoyancy of each beam to be regulated separately from other beams. Each beam may further include a drain to allow egress of fluid out of the beam. For example, the opening may be on the top side of the beam and the drain on the underside. Water may be drained by lifting the module from the surface of the body of water and allowing it to flow out of the drain, or by applying pressurised air to the opening and thus forcing water out of the drain. The opening and/or the drain may be fitted with a vandal proof screw cap, plug or other seal and opened and closed as required.

Where the plurality of hollow beams are connected such that internal channels flow between the beams, one opening in the module may enable ingress of fluid into all of the beams. For example, the plurality of hollow beams may be integrally formed to provide a single hollow cavity inside the module.

In an embodiment where each beam is separately formed, each beam may include a keyway at each end of the beam for connecting the beam to two adjacent beams. The keyways of adjacent beams may be connected with a key, ensuring alignment of the beams with respect to each other. This connection system may provide greater structural integrity to the module. The keyway connection may also make it simple and easy to correctly orient and connect the beams, facilitating rapid installation of the floating wetland structure.

The support structure and frame may be integrally formed or may be separately formed. Where the support structure is separately formed, to facilitate connecting the support structure to the beam, each beam may include one or more inner keyways for connecting the beam to the support structure.

For example, each beam may include three inner keyways. It will be appreciated however that one, two, four or more keyways could also be used. The support structure may then be attached to the frame by using a key to connect a keyway in the support structure with an inner keyway in the beam. Alternatively, the key may be incorporated into the support structure, such that the support structure may be slotted into the keyway of the beam, preventing relative movement between the support structure and the frame. The key is inserted into the keyway with a screw connection to prevent it from popping out and to minimise vandalism.

The support structure may include one or more joists. The joists may be integrally formed with the frame in a unitary structure or may be separately formed. Where the joists are separately formed, each joist may include a key (or keyway) at each end of the joist for connecting the joist to the frame.

Containers for growing plants in the wetland may be conveniently balanced between, or placed upon, two or more joists or beams or between or placed upon a joist and a beam. The joists may be arranged parallel to each other, spanning between two beams of the frame, or may cross in a grid pattern with one or more joists spanning between two beams and one or more perpendicular joists, spanning between two different beams in the frame. Other configurations of joists or other supporting structures may be used.

To facilitate connecting the floating modules together, each beam of the frame may include one or more outer keyways for connecting the beam to a beam of the frame of an adjacent module. For example, each beam may include five outer keyways. It will be appreciated however that one, two, three, four, six or more keyways could also be used. The modules may then be connected to each other by using a key to connect an outer keyway in a beam to an outer keyway in a beam of an adjacent module. Each beam of the frame of the module may be attached to a beam of the frame of an adjacent module in this way, to build up the floating wetland structure to a desired size.

In an embodiment, the outer keyways may be specifically designed and/or modified to provide an anchoring function for the wetlands. For example, the outer keyways may be designed such that cable anchors could connect to the keyways by way of a plate or beam that can slot into the keyways, for example, from the top. The length of a connection beam connecting the anchor to the floating wetland structure may allow operational loads to be spread over a wider area. The cable or chain anchor may extend below the wetland or may involve a connection post system for cables extending above the wetland. The outer keyways may also be designed to connect to posts for balustrading or safety fencing, or for other applications such as appurtenances like handrails, walkways, benches, etc.

Alternatively, a pile anchoring system may be used. In this embodiment, one or two of the internal modules may be fitted with a large platform-sleeve arrangement that is able to slide over anchoring piles driven into the bottom of a lake. The floating modules may move up and down on the piles as the water depth changes. It will be appreciated that alternative anchoring systems may be used, for example, the floating wetland structure may be anchored to the base of a water body by a weight, for example a concrete block.

Each beam may further include one or more protrusions or shear plugs for aligning the beam to a beam of an adjacent module and preventing movement once a key is inserted into an outer keyway of the beam. The protrusions or shear plugs may assist in correctly locating two beams relative to each other and ensuring that the beams cannot move up and down vertically, and left and right horizontally, relative to each other once the key is inserted into the keyway.

Where the frames include four beams, the modules may be connected in a grid pattern, with a beam of each module connected to a single beam of an adjacent module. Alternatively, the modules may be connected in a staggered pattern, with a beam of each module connected to two beams of an adjacent module. The positioning of outer keyways in the beams may facilitate this flexibility in connecting the modules. The keyway connection system may also allow sufficient movement between inter-connected modules to ensure durable and long-term performance of the floating wetland structure, able to withstand wind and wave actions.

The floating wetland structure may be conveniently constructed from a number of identical beams, connected to each other to form a frame, which is then connected to other frames to form the overall structure. This may allow for ease of manufacturing and transport, as a single beam design may be used to create a wetland of flexible shape and size.

Alternatively, the modules may be constructed as single integrally formed units, which are connected together to form the floating wetland structure. A single module design may be used to create a wetland of flexible shape and size.

In an embodiment, the module may be constructed from UV stabilised high-density polyethylene (HDPE) or low-density polyethylene (LDPE), making it suitable for use in both fresh and salt water environments. The HDPE or LDPE may be moulded into hollow beams and joists, which may be formed separately and then connected together, or formed integrally in a unitary structure. The module may be moulded using typical plastic manufacturing processes, such as rotor moulding, injection moulding, and blow moulding. UV-stabilised polypropylene (PP) or other synthetic materials such as nylon may be used for components of the modules, such as the containers/baskets, the keys/connectors, and similar. In another embodiment, the module is at least partially filled with foam, such as expandable polyurethane foam, that is poured in, expands to fill the void within the module, and provides buoyancy to the module. Other foam options may also be used, such as closed cell foam types, that perform the function of not absorbing water and having tiny closed cells/voids that are not interconnected.

Further, the containers for growing plants in the wetland may alternatively be manufactured from UV stabilised HDPE or LDPE. It will be appreciated that other plastics and other materials may also be used for the manufacture of components of the modules.

The floating wetland structure may further include a plurality of containers for growing plants in the wetland. Each container may include a supporting rim or projections for resting on the support structure, or on the support structure and frame. Alternatively, part of the base of the container may rest on the support structure, or on the support structure and frame. The containers may be formed in a mesh or have holes for the roots of the plants to extend through and into the water. The containers may thus allow plant roots to grow directly into water, which may facilitate water treatment. The containers may alternatively include an underlying substrate into which the plant roots may grow. The containers may be removed at any time, allowing for plant harvesting or replacement. The containers may be produced in a variety of shapes and sizes to allow for strengthening or buoyancy adjustments as required or for planting of different plant species or other uses.

The floating wetland structure may further include one or more platforms adapted to be supportable by the support structure, or by the support structure and frame. These platforms may be positioned on the support structure and used as a walkway or floating bridge for people or wildlife to walk across the floating wetland, or other uses such as a viewing area or seating platform. The platforms may also be used for the habitation of terrestrial and aquatic/amphibious fauna on water bodies and waterways. The platforms may be plastic grids or sheets, for example constructed from UV stabilised HDPE or LDPE, or other suitable material. In an embodiment, the platforms may be specifically designed and/or modified to provide an anchoring function for the wetlands. Also, the platforms may have a non-slip surface.

According to another aspect, the present invention provides a module for a floating wetland structure including a frame that is at least partially hollow and a support structure adapted to support a plurality of containers for growing plants in the wetland.

The module may include any one or more of the features described above. For example, the frame and support structure of the module may be integrally formed in a unitary structure. Alternatively, the frame and support structure may be separately formed and connected together. For example, the frame may include a plurality of hollow beams connected together. Each beam may include a number of keyways—such as a keyway at each end of the beam for connecting the beam to two adjacent beams, one or more inner keyways for connecting the beam to the support structure.

Whether the frame and support structure are integrally formed or separately formed, each beam of the frame may include one or more outer keyways for connecting the beam to a beam of another module. In this way, modules may be connected together to form a floating wetland structure. Each beam may further include one or more protrusions or shear plugs for aligning the beam to a beam of an adjacent module and preventing movement once a key is inserted into an outer keyway of the beam.

BRIEF DESCRIPTION OF DRAWINGS

Embodiments of the invention will now be described with reference to the accompanying drawings. It is to be understood that the embodiments are given by way of illustration only and the invention is not limited by this illustration. In the drawings.

DETAILED DESCRIPTION

Figure 1:
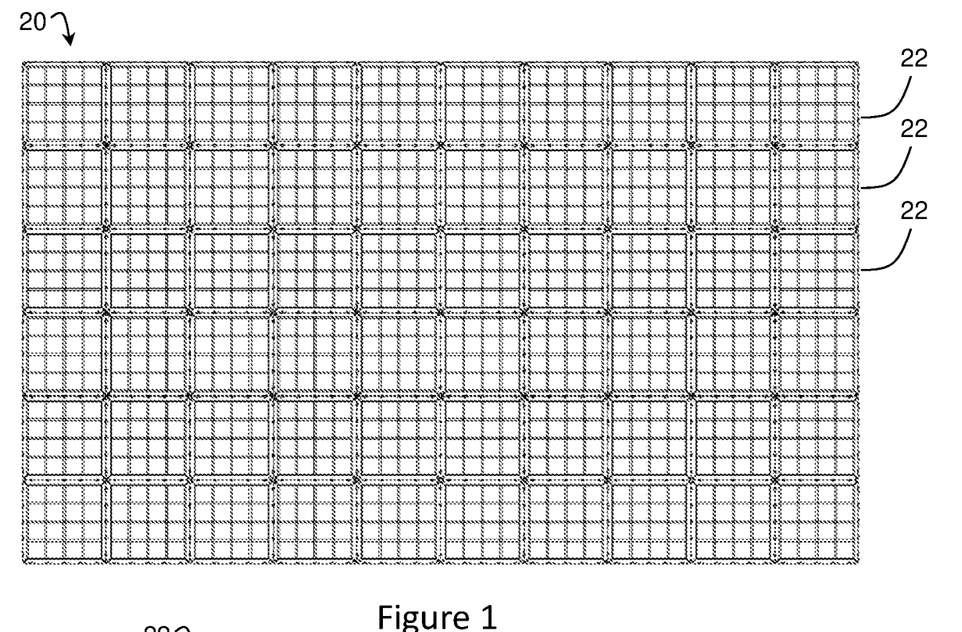
FIG. 1 is a plan view of a floating wetland structure with modules connected in a grid pattern according to an embodiment of the invention.

Referring to FIG. 1, there is shown a floating wetland structure 20 according to an embodiment of the invention. The floating wetland structure 20 includes a plurality of floating connected modules 22 connected together as will be described below. In the embodiment shown in FIG. 1, the modules 22 are square shaped and connected in a 10×6 grid pattern, however, it will be appreciated that the modules 22 may be of other shapes and connected in different size and shape configurations as desired for the body of water they are to be placed on.

Figure 2:
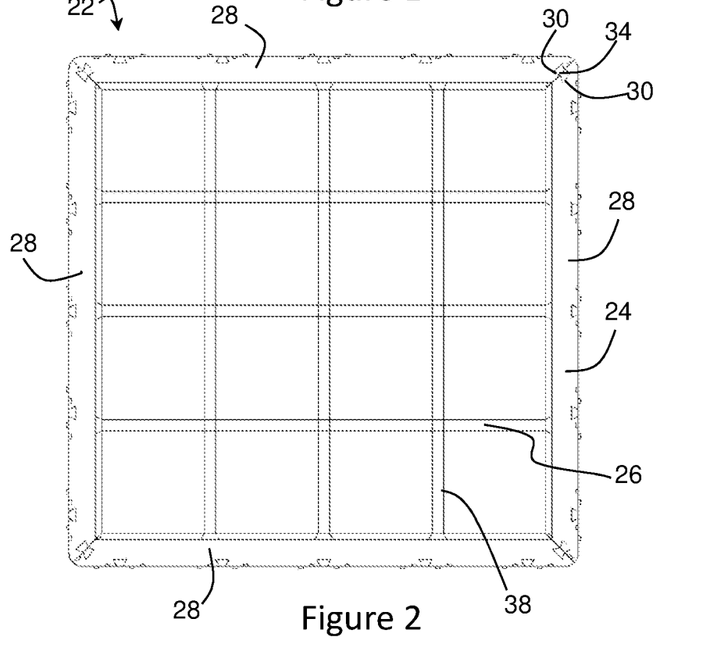
FIG. 2 is a plan view of a module of the floating wetland structure of FIG. 1.

As can be seen in FIG. 2, each module 22 has a frame 24 and a support structure 26 connected to the frame 24. The frame 24 surrounds the support structure 26 and may be at least partially hollow, to increase its buoyancy. The support structure 26, which in this example is grid shaped, is adapted to support a plurality of containers for growing plants in the wetland.

Figure 3:
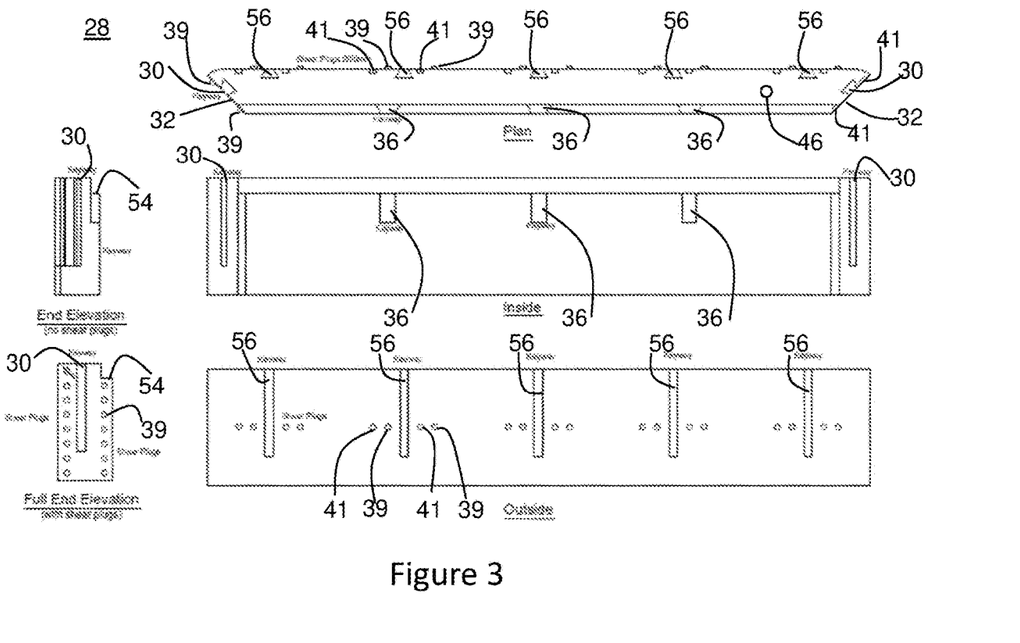
FIG. 3 is a plan view, an inside elevation view, an outside elevation view and two end elevation views of a beam of the module of FIG. 2.
Figure 4:
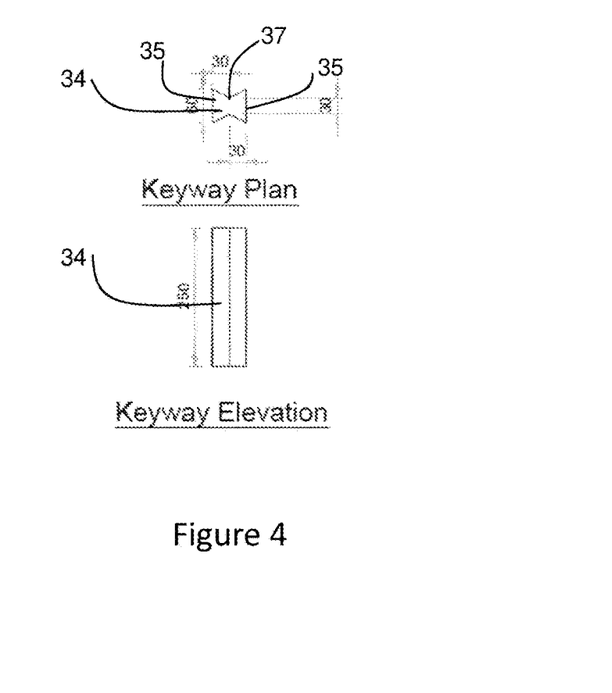
FIG. 4 is a plan view and an elevation view of a key for connecting the beams of FIG. 3 together.
Figure 5:
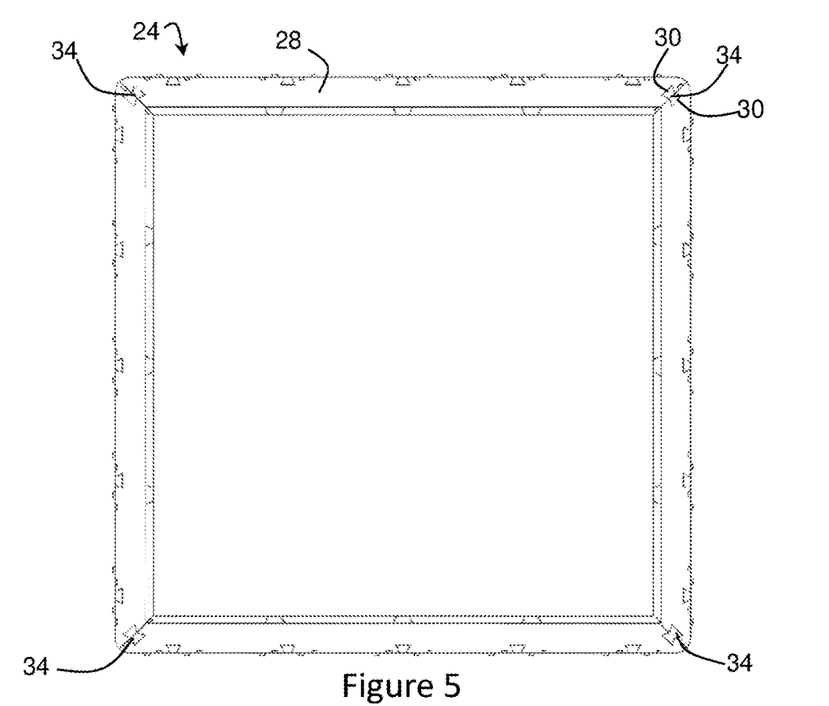
FIG. 5 is a plan view of a frame comprised of four connected beams of FIG. 3.

The frame 24 of this embodiment includes four hollow beams 28 constructed from UV stabilised HDPE or LDPE. Details of each hollow beam 28 can be seen in FIG. 3. Each beam 28 includes a keyway 30 at each end 32 of the beam for connecting the beam 28 to two adjacent beams. The ends 32 of the beam 28 are slanted at a 45 degree angle to allow the end 32 of a beam 28 to align with the end of another beam positioned perpendicularly to it. Beams are connected together using a key 34 as shown in FIG. 4. As can be seen, the cross section of the key 34 tapers from wider edges 35 to a narrow section 37 in the middle of the key 34. It will be appreciated that other designs of keys 34 and keyways may be used. The key 34 is inserted into the slot formed between the keyways 30 of two adjacent beams 28 (see FIG. 2), thus holding them in alignment with each other. The key 34 may also be formed from UV stabilised HDPE or LDPE. FIG. 5 shows the four hollow beams 28 connected together using keys 34 to form an outer frame 24.

Shear plugs 39 are located either side of the keyway 30 at one end 32 of the beam 28, and recesses 41 are located either side of the keyway 30 at the other end of the beam 28. The shear plugs 39 may be inserted into the recesses 41 to correctly locate the two beam ends 32 and to secure the ends 32 together and ensure that they cannot move up and down vertically once the key 34 is inserted into the slot formed between the keyways 30 of two adjacent beams 28.

For connecting the inner support structure 26 to the frame 24, each beam 28 includes three inner keyways 36 as shown in FIG. 3. It will be appreciated that a different number of keyways 36 may be used, depending on the desired shape and size of the support structure.

Figure 6:
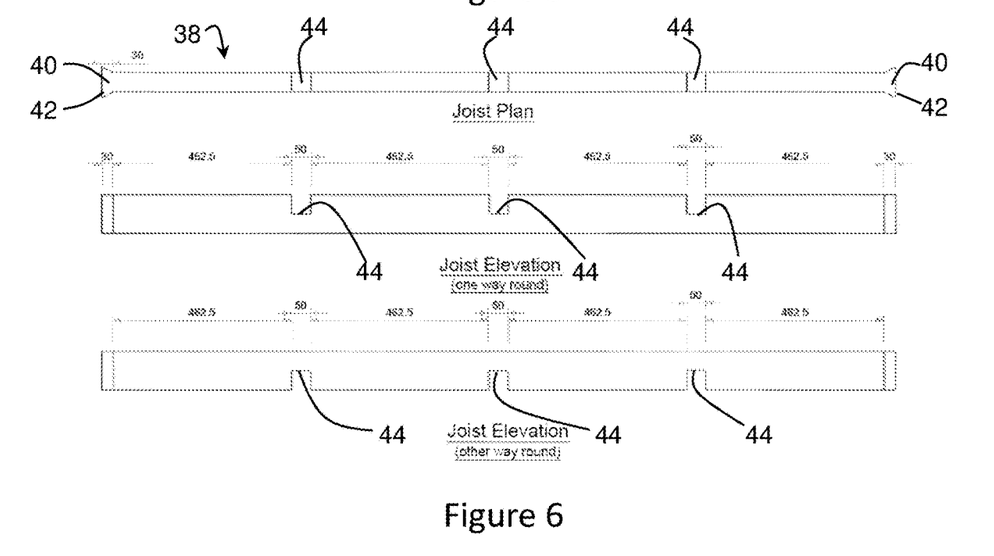
FIG. 6 is a plan view and two side elevation views of a joist according to an embodiment of the invention.

The inner support structure 26 of the module 22 in this embodiment includes six joists 38. Details of the joists 38 can be seen in FIG. 6. Each joist 38 is elongated and includes a key 40 at each end 42 of the joist 38 for connecting the joist 38 to the frame 24 by slotting the key 40 into an inner keyway 36 of the beam 28. The joist 38 also includes three slots 44 for accommodating other joists positioned perpendicularly to the joist 38. The three slots 44 on three joists 38 may be aligned with and slotted into slots 44 on three perpendicular joists 38, such that six joists form a grid with a level surface. This configuration of joists 38 and beams 28 can be seen in FIG. 2. The joists 38 may be formed from UV stabilised HDPE or other plastic or synthetic materials.

Referring back to FIG. 3, each beam 28 includes an opening 46 on a top face of the beam 28 to allow ingress of fluid into the beam 28, and a drain (not shown) on an underside of the beam 28 to allow egress of fluid out of the beam 28. Buoyancy of the beam 28 can thus be regulated by adding or removing water or other fluids from the hollow beam 28 via the opening 46 and/or drain. Pressurised air may be used to assist in removing water from the beam 28. A vandal proof screw cap may be fitted to the opening and/or drain.

The ability to regulate the buoyancy of each beam 28 individually may provide greater flexibility in the layout of the floating wetland structure. If heavy containers are placed on one side of the structure and lighter containers on the other, this may be compensated for by adjusting the buoyancy of each beam 28 to a different extent, such that the module 22 is stable on the body of water and able to withstand variable weather conditions.

Figure 7:
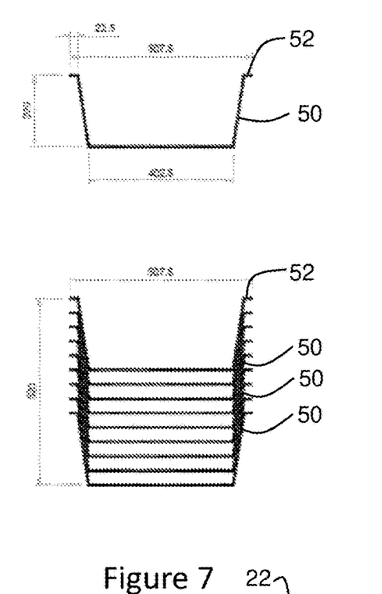
FIG. 7 is a sectional side elevation view of a container and a plurality of stacked containers according to an embodiment of the invention.
Figure 8:
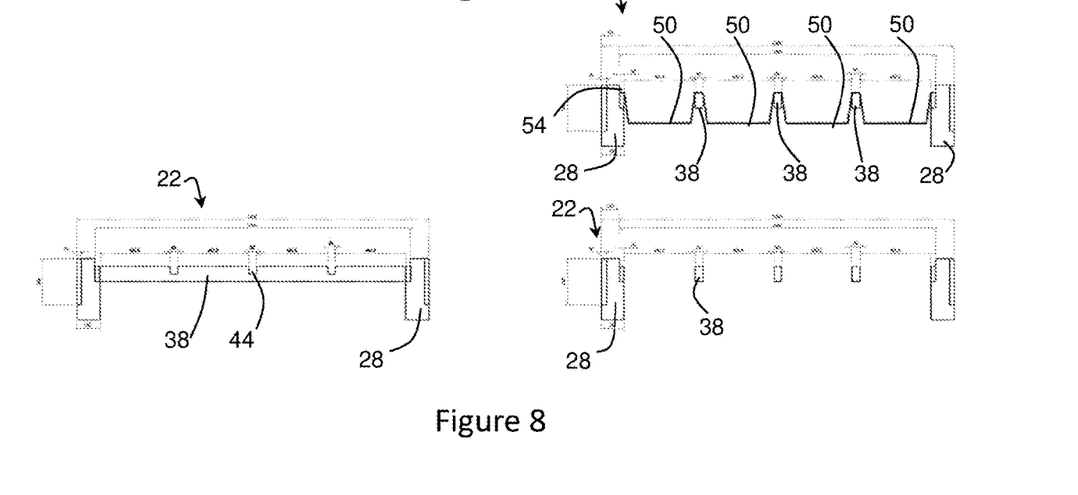
FIG. 8 shows sectional side views of the module of FIG. 2 supporting a plurality of containers.

Containers or baskets 50 according to an embodiment of the invention, for growing plants in the wetland, are shown in FIG. 7. The containers 50 include a supporting rim 52 for resting on the support structure 26. For example, the rim 52 may surround the container 50 and be supported by the joists 38 and beams 28. FIG. 8 shows sectional views of the module 22 with containers 50 supported by the joists 38 and supporting lips 54 of the beams 28. Details of the supporting lips 54 of the beams can be seen in the end elevation views of the beam 28, shown in FIG. 3. As can be seen in FIG. 7, some containers 50 are wholly supported by joists 38, and some containers 50 are supported by the joists 38 and beams 28.

In alternate design, the joists 38 may be lowered with the containers or baskets 50 sitting on top of the joists 38. In this embodiment, part of the base of the container may rest on one or more joists 38.

Instead of filling the floating wetland structure 20 with containers or baskets 50, areas of the floating wetland structure 20 may be laid with platforms. These platforms may form bridges or walkways for individuals or wildlife to walk across the floating wetland 20. The platforms may span a plurality of modules 22 in the floating wetland structure 20.

Figure 9:
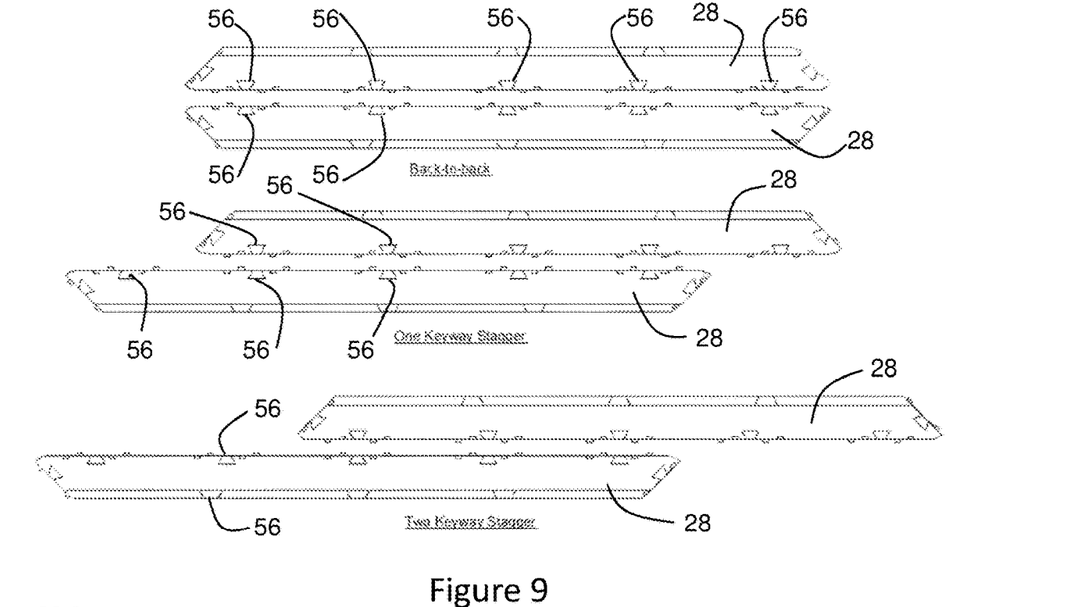
FIG. 9 is a plan view of beams arranged in different alignments with respect to other beams.

The connection of modules 22 together will now be described. With reference to FIGS. 3 and 9, each beam 28 includes five outer keyways 56 for connecting the beam 28 to a beam of an adjacent module. It will be appreciated that other numbers of keyways (e.g. 1, 2, 3, 4, 6, and 7) may be provided. Beams 28 of adjacent modules may be aligned such that their outer keyways 56 line up, and a key 34 of the design shown in FIG. 4 may be used to connect the lined up keyways 56 and therefore the beams 28. Shear plugs 39 and recesses 41 may also be used to align the beam 28 to a beam of an adjacent module and prevent movement once a key 34 is inserted into a slot formed between the outer keyways 56 of the two beams 28.

Figure 10:
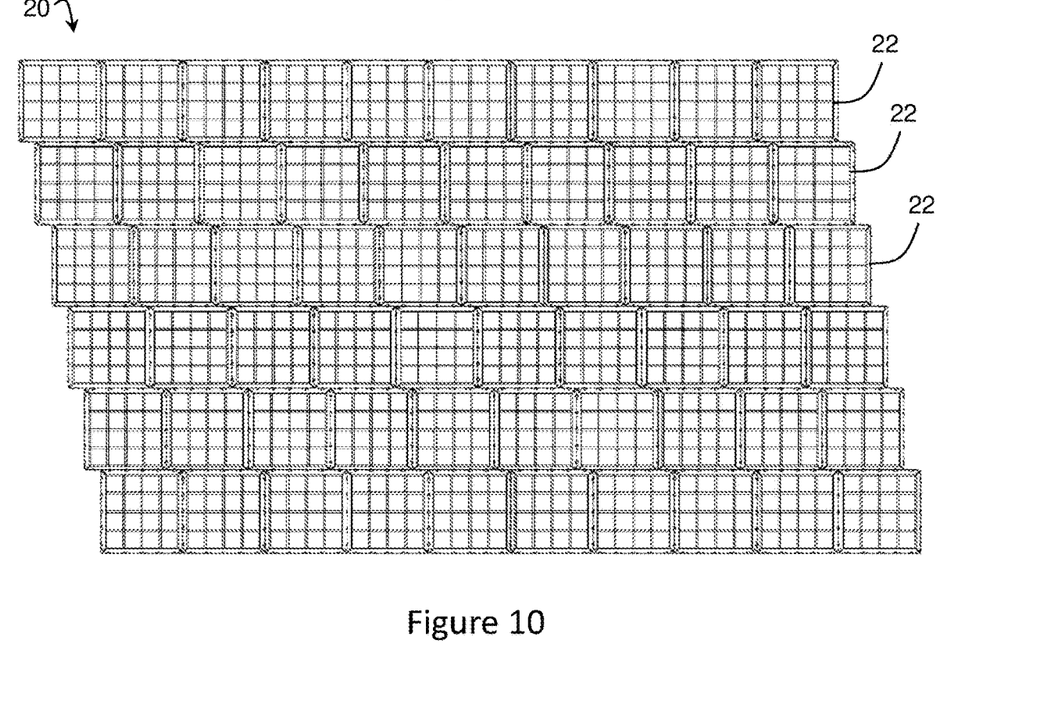
FIG. 10 is a plan view of a floating wetland structure with modules connected in a one keyway stagger pattern.
Figure 11:
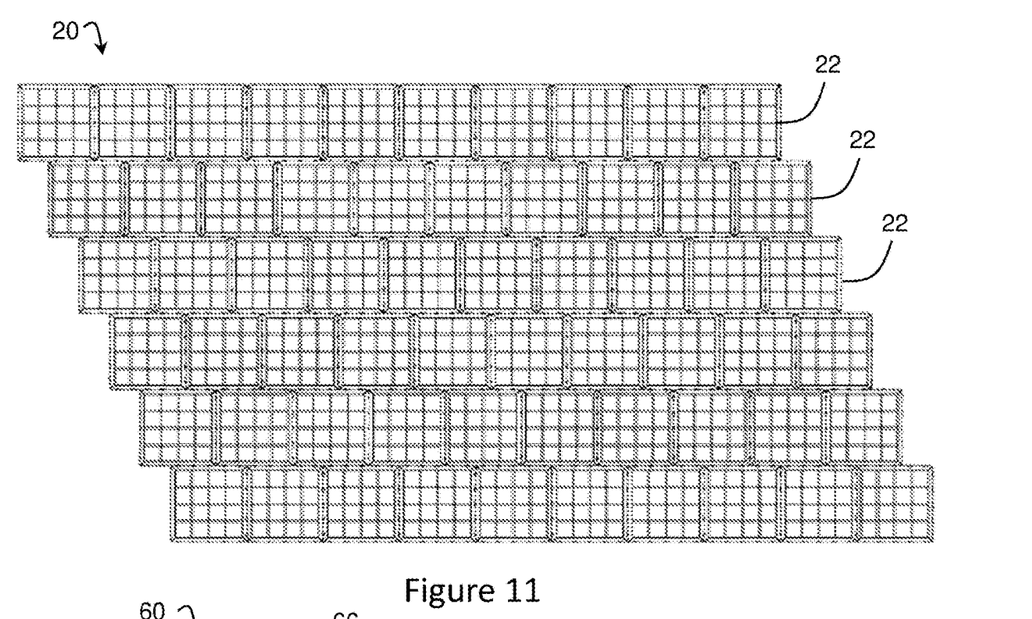
FIG. 11 is a plan view of a floating wetland structure with modules connected in a two keyway stagger pattern.

The beams 28 may be aligned back to back, as shown in the top of FIG. 9, resulting in the modules 22 being connected a grid pattern, as shown in FIG. 1. Alternatively, the beams 28 of adjacent modules 22 may be aligned in a one keyway stagger, as shown in the middle of FIG. 9, where a first outer keyway 56 of a first beam 28 is aligned with a second outer keyway 56 of a second beam 28. This results in the modules 22 being connected in a one keyway staggered pattern as shown in FIG. 10. Further alternatively, the beams 28 of adjacent modules 22 may be aligned in a two keyway stagger, as shown at the bottom of FIG. 9, where a first outer keyway 56 of a first beam 28 is aligned with a third outer keyway 56 of a second beam 28. This results in the modules 22 being connected in a two keyway staggered pattern as shown in FIG. 11.

Figure 12:
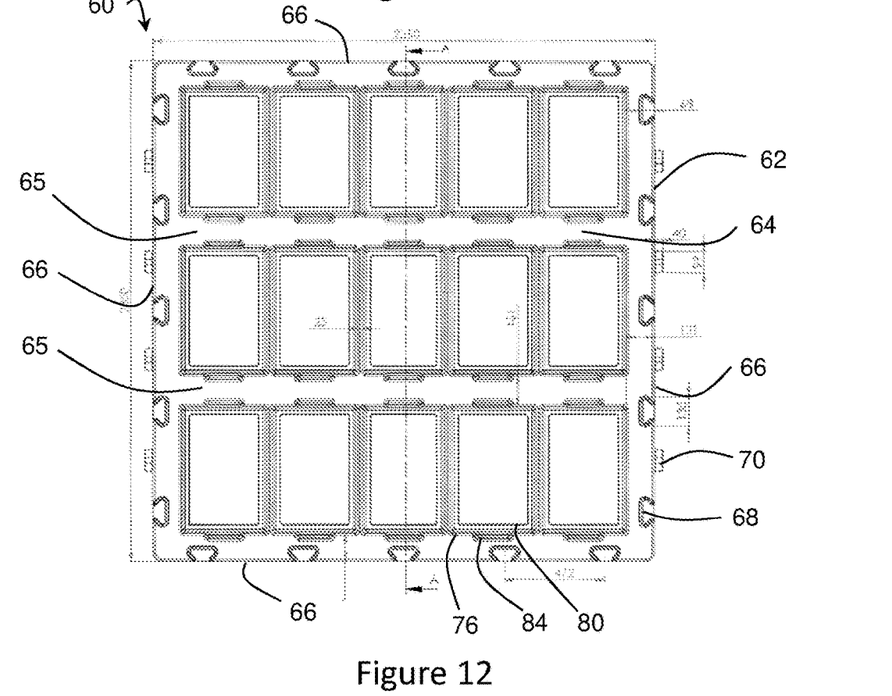
FIG. 12 is a plan view of a module of a floating wetland structure according to another embodiment of the invention.

Another embodiment of the invention will now be described with reference to FIGS. 12 to 19. Referring to FIGS. 12 and 15, there is shown an alternate module 60 of a floating wetland structure. The module 60 is a unitary structure having a frame 62 and a support structure 64 adapted to support a plurality of containers for growing plants in the wetland. The frame 62 is hollow and includes four beams 66 which surround the support structure 64. The support structure 64 includes two internal beams 65, which may also be hollow, extending in one direction and four smaller beams perpendicular to the internal beams 65, which may also be hollow. It will be appreciated that a different number or pattern of internal beams could be used in the support structure, for example, a grid pattern. Unlike the module 22 of FIG. 2, in which the beams 28 and joists 38 were separately formed and connected by keyways, in this embodiment, the beams 66 and support structure 64 are integrally formed in a single structure.

In this embodiment, the beams 66 of the frame 62 and inner beams 65 of the support structure 64 may all be hollow with internally connected channels to which fluid may be added/removed to adjust the buoyancy of the module 60. The module 60 may be moulded from UV stabilised HDPE or LDPE or any other appropriate plastic.

Figure 13:
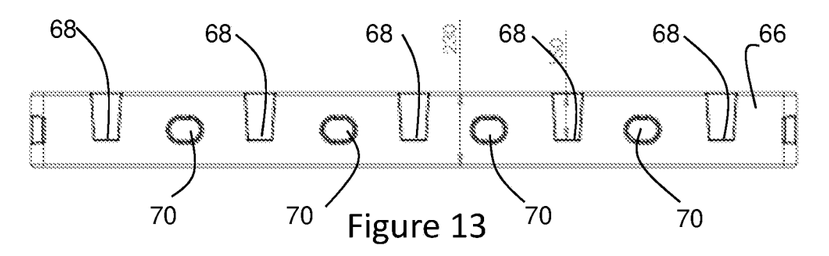
FIG. 13 is a side view of a beam of the module of FIG. 12.
Figure 17:
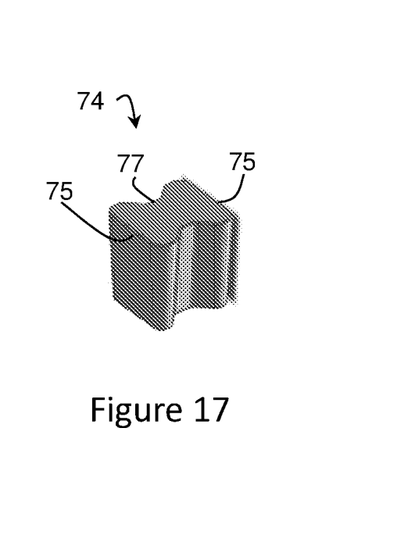
FIG. 17 is an elevation view of one version of a key for connecting a beam of the module of FIG. 12 to a beam of an adjacent module.

With reference to the embodiment of FIGS. 12 and 13, each beam 66 includes five outer keyways 68 for connecting the beam 66 to a beam of an adjacent module. In another embodiment (not shown), each beam 66 includes three outer keyways 68. As discussed, it will be appreciated that any number of keyways could be used for connecting the beam 66. Beams 66 of adjacent modules may be aligned such that their outer keyways 68 line up, and a key 74 of the design shown in FIG. 17 may be used to connect the lined up keyways 68 and therefore the beams 66. As shown in FIG. 17, the connector or key 74 may have a cross section which tapers from wider edges 75 to a narrow section 77 in the middle of the key 74. Alternatively, another design of a key is used, such as the design of the key 94 shown in FIG. 23.

Each beam 66 further includes protrusions 70 or recesses 72, or a combination of protrusions 70 and recesses 72, such that a protrusion 70 on one beam 66 mates with a recess 72 on a beam of an adjacent module to align the two beams. Recesses 72 can be seen in FIGS. 15 and 18. A protrusion 70 recess 72 pair also prevents movement of the connected modules once a key 74 has been inserted into a slot formed between the outer keyways 68 of two beams 66.

The support structure 64 of the module 60 includes a plurality of container supports 76 for supporting a plurality of containers 78 for growing plants in the wetland. The module 60 shown in FIG. 12 includes fifteen container supports 76 arranged in a 5×3 grid pattern, but it will be appreciated that a different number and/or size of container supports 76 may be used.

Figure 14:
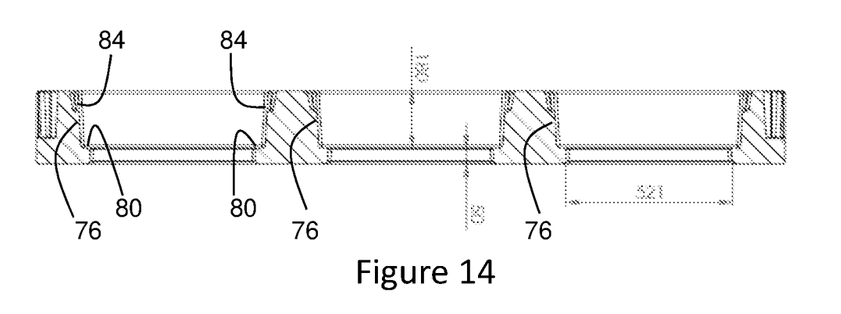
FIG. 14 is a sectional side view of the module of FIG. 12 taken across the line A-A on FIG. 12.
Figure 15:
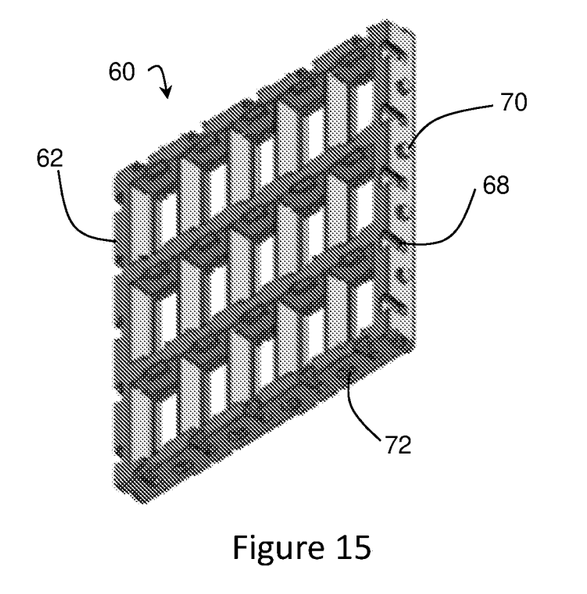
FIG. 15 is an elevation view of the module of FIG. 12.

As can be seen in FIG. 14, the container supports 76 include a bottom supporting lip 80, on which part of the container 78 may rest, such that the roots of plants growing in the container 78 may be exposed to a water body on which the module 60 is floating. For example, the edge of the bottom 82 of a container 78 or a rim or projections around the container 78 may rest on the supporting lip 80.

The container supports 76 also include an access recess 84, which enables access to remove a container 78 fully contained within the container support 76 (i.e. sitting below a top surface of the module 60). For example, the container 78 could be lifted out of the module 60 by inserting a user's hands into the access recesses 84, gripping the container 78 and lifting it out.

Figure 16:
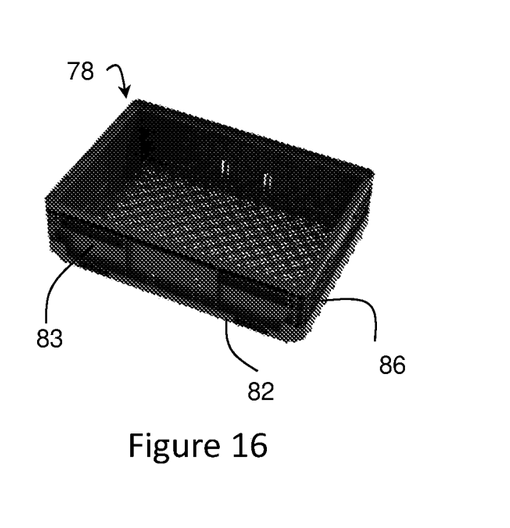
FIG. 16 is an elevation view of a container according to another embodiment of the invention.

Details of suitable containers 78 are shown in FIG. 16. The containers 78 are generally rectangular shaped and include holes in the bottom 82 and sides 83 to enable ingress of water into the containers 78 and to enable plant roots to extend through the containers 78 and into the water. The containers 78 also include projections 86 extending out around the bottom 82 of the container 78, which are designed to rest on the supporting lip 80 of a container support 76. The containers 78 may be manufactured from UV stabilised polypropylene or other suitable plastic material or other materials.

Figure 18:
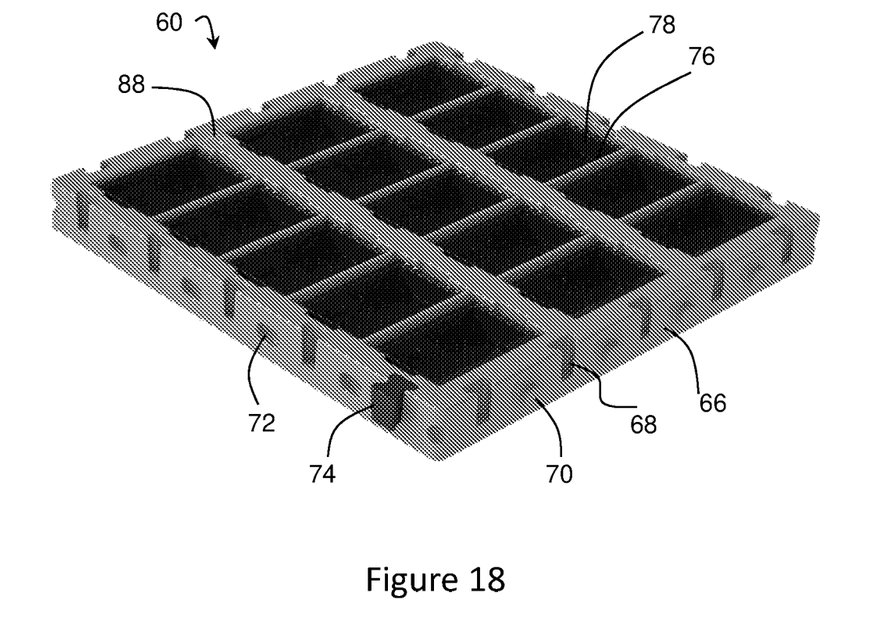
FIG. 18 is an elevation view of a module of FIG. 12 supporting a plurality of containers of FIG. 16.
Figure 19:
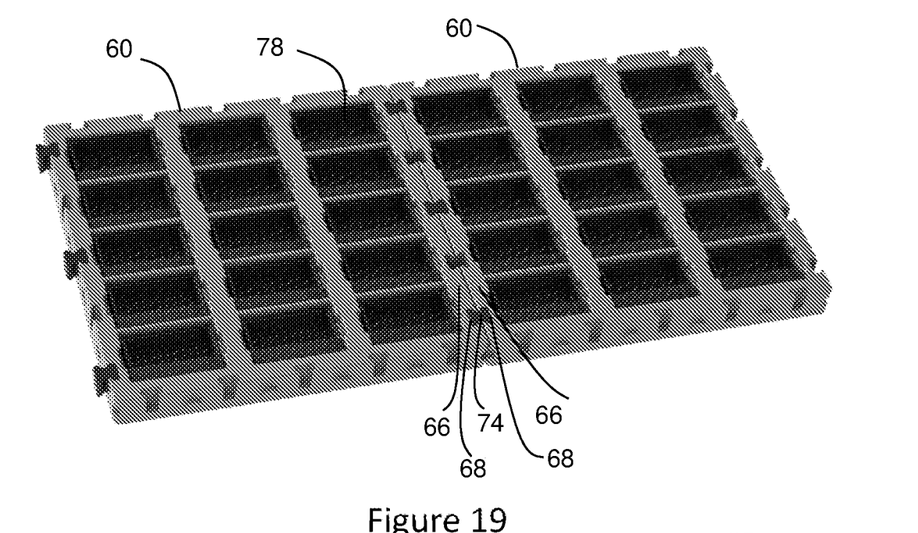
FIG. 19 is an elevation view of two modules of FIG. 12 connected together.

A module 60 with containers 78 inserted into its container supports 76 is shown in FIG. 18. Similarly to the module 22 described above, walkways or platforms may be laid on the module 60 instead of containers to allow passage of people or wildlife. The module 60 may be connected to other modules in a grid or keyway stagger pattern, similarly to the module 22 described above. Two connected modules 60 are shown in FIG. 19, with keys 74 inserted into the slots formed between the outer keyways 68 of adjacent beams 66 of the two modules.

As shown in FIG. 18, the module 60 also includes an opening 88 with a screw cap to allow regulation of the buoyancy of the module 60 by adding or removing fluid from the module 60. Fluid may be added or removed from the cavity comprising the hollows in the beams 66 and the inner beams 65 of the support structure 64 between the container supports 76, thus enabling the buoyancy of the module 60 to be increased or decreased as required.

Figure 20:
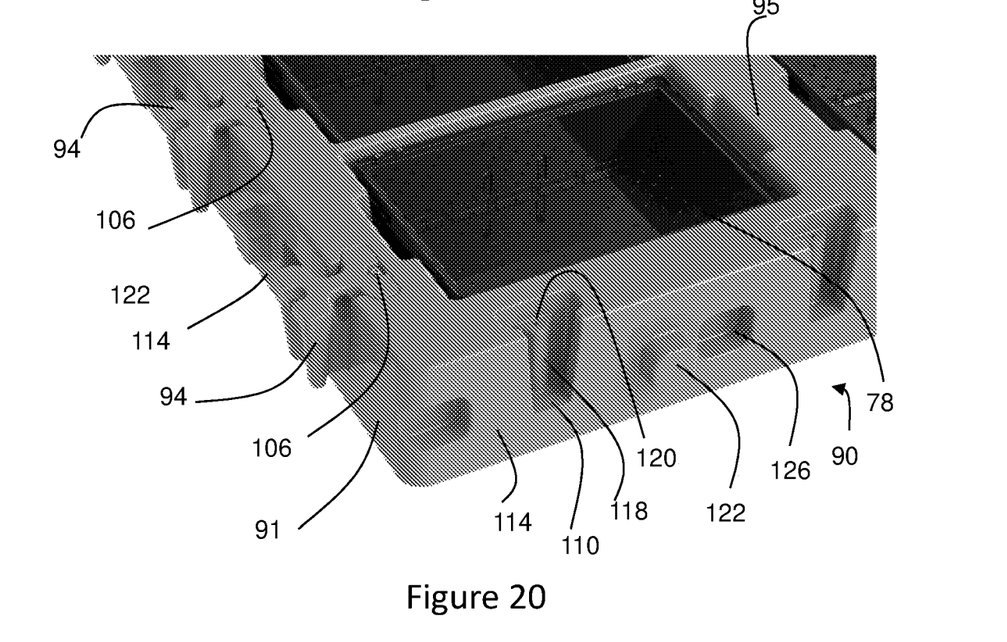
FIG. 20 is a partial elevation view of a module according to another embodiment of the invention.
Figure 21:
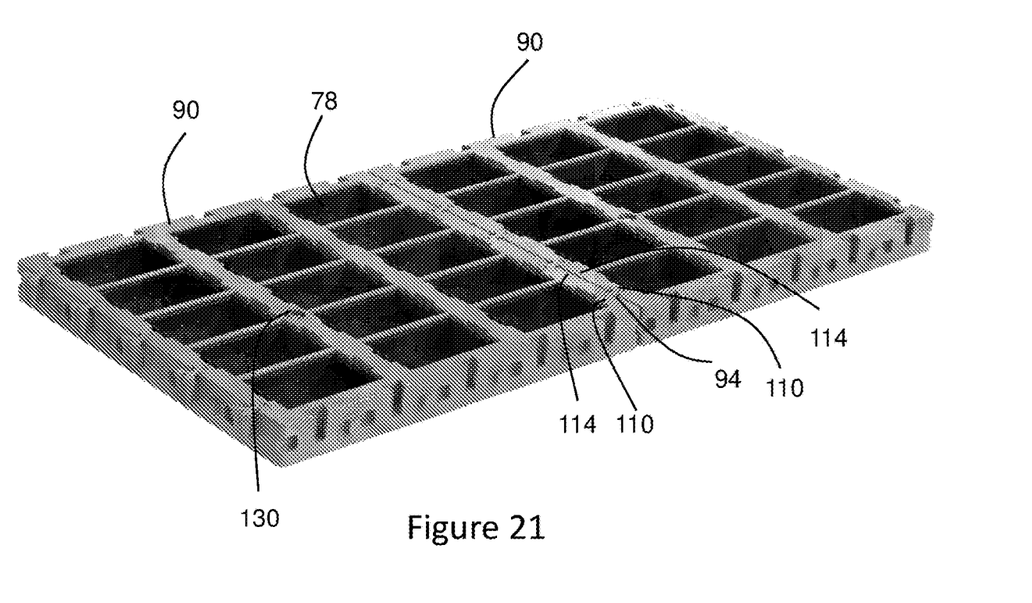
FIG. 21 is an elevation view of two modules of FIG. 20 connected together.
Figure 22:
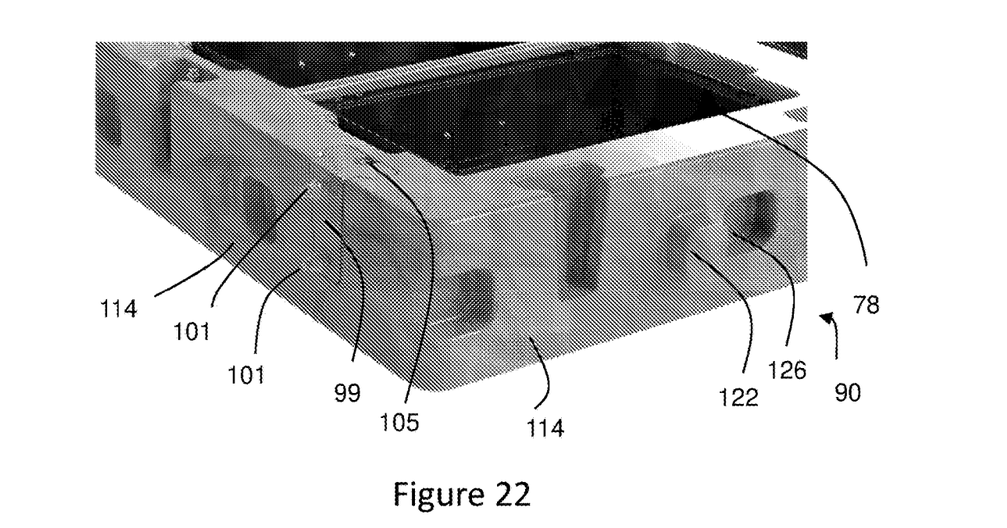
FIG. 22 is a partial elevation view of the module of FIG. 20 with an alternate key.
Figure 23:
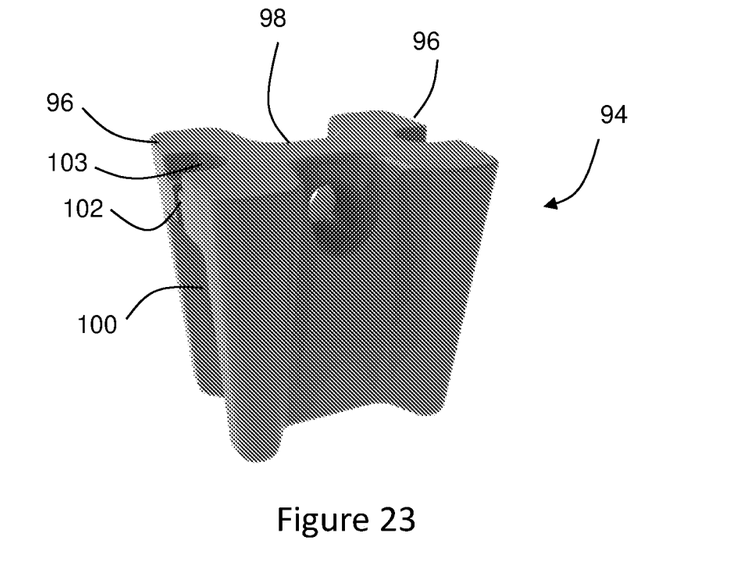
FIG. 23 is an elevation view of another version of a key for connecting a beam of the module of FIG. 20 or FIG. 24 to a beam of an adjacent module.
Figure 24:
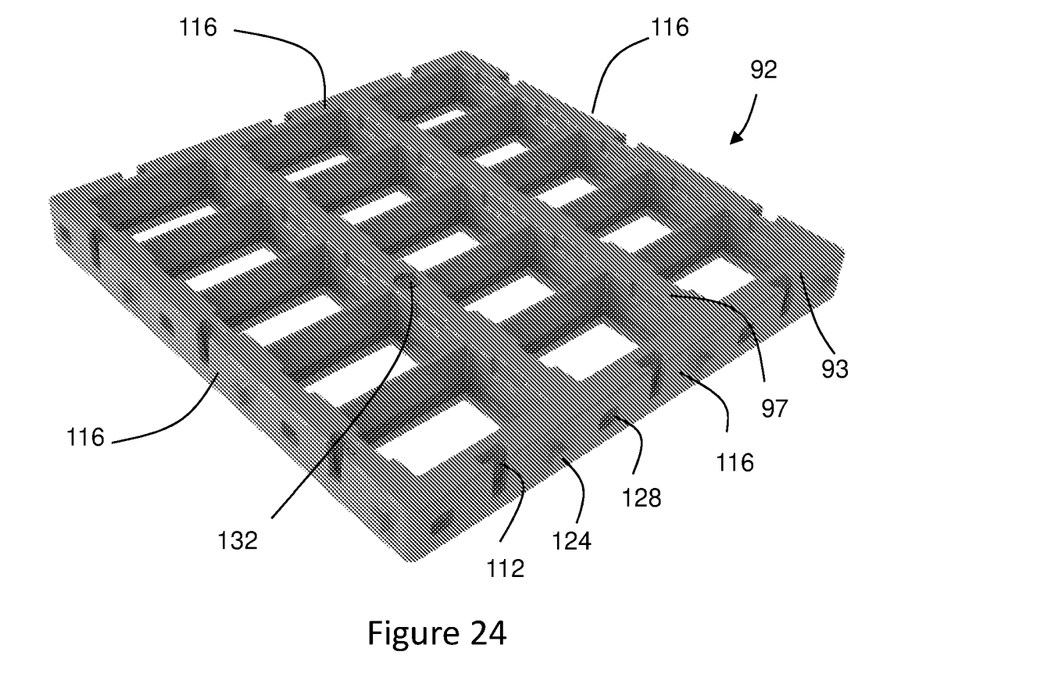
FIG. 24 is an elevation view of a module according to another embodiment of the invention.

Alternate embodiments of a unitary structure module include the module 90 shown in FIGS. 20 to 22; and the module 92 shown in FIGS. 23 and 24. The modules 90, 92 include the above described features of module 60 apart from a few differences, as will be described below.

Each module 90, 92 includes a hollow frame 91, 93 having four beams 114, 116 which surround a support structure 95, 97. The beams 114, 116 and support structure 95, 97 are integrally formed in a single structure. Each beam 114, 116 includes a number of outer keyways 110, 112 for connecting the beam 114, 116 to a beam of an adjacent module (five outer keyways 110 per beam 114 in module 90 and three outer keyways 112 per beam 116 in module 92). Containers 78 as shown in FIG. 16 may be used with the modules 90, 92.

The modules 90, 92 use an alternate connector key 94 as shown in FIG. 23. The connector key 94 has two wider outer sides 96 and a narrower section 98 in the middle of the key 94. The sides 96 each have a channel 100 partially extending down the length of the key 94, with a screw receiving portion 102 above the channel 100. The channel 100 is partially cylindrical, but may also take other shapes. A recess 103 above the screw receiving portion 102 enables access to the screw receiving portion 102. The outer keyways 110, 112 in the beams 114, 116 of the modules 90, 92 have corresponding protrusions 118 onto which the channel 100 may slide and be positioned, each protrusion 118 having a screw receiving portion 120 on top, as best seen in FIG. 20.

When one side 96 of the key 94 is inserted into an outer keyway 110, 112, the screw receiving portion 102 of the key 94 aligns with the screw receiving portion 120 in the outer keyway 110, 112. A screw 106 may then be inserted into the two aligned screw receiving portions 102, 120, to more securely hold the key 94 in place, as shown in FIG. 20. The screw 106 prevents the key 94 from popping out and thus prevents against vandalism.

An alternate connector key 99 is shown in FIG. 22, secured into an outer keyway 110 of a beam 114 of the module 90. The alternate connector key 99 has the same shape and configuration as the connector key 94 shown in FIG. 23, except that it is made in two parts, bolted together (only one side is shown in FIG. 22). Two bolts 101 connect the two sides of the alternate connector key 99 to each other, and to the beam 114 of the module 90. This may provide a degree of vandal proofing to the connector key, as the bolts 101 are not easily accessible once the connector key 99 is secured in place. A screw 105 also secures the connector key 99 to the module 90 in the manner explained above. This alternate connector key 99 may also be used for a variety of applications including fixing posts for fencing and balustrading, or for securing anchor plates as mentioned.

The modules 90, 92 include openings 130, 132 with a screw cap to allow regulation of the buoyancy of the modules 90, 92 by adding or removing fluid from the module. The openings 130, 132 are positioned closer to the centre of the modules 90, 92 than the opening 88 in module 60.

Modules 90 and 92 also differ from module 60 described above in that each beam 114, 116 of modules 90, 92 include both protrusions 122, 124 and recesses 126, 128, which mate with corresponding recesses 126, 128 and protrusions 122, 124 on a beam of an adjacent module. As can be seen in the figures, the protrusions 122 and recesses 126 of module 90 are closer together than the protrusions 124 and recesses 128 of module 92, which are more evenly spaced between the outer keyways 112.

Figure 25:
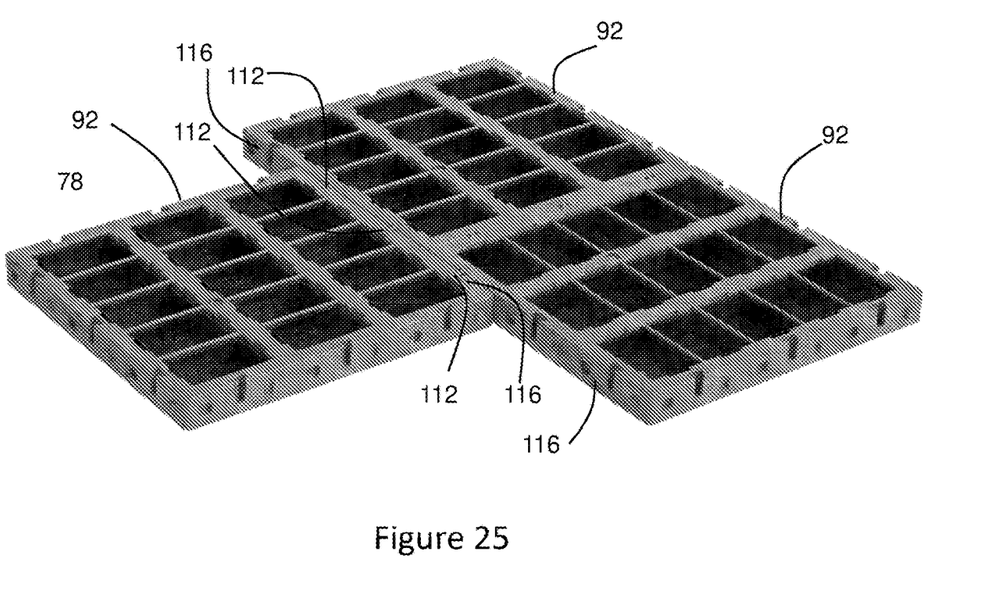
FIG. 25 is an elevation view of three modules of FIG. 24 connected together in a staggered pattern.

The connection system including the outer keyways 110, 112 and keys 94 enable the modules 90, 92 to be connected together, to build up the floating wetland structure to a desired size. FIG. 21 shows two modules 90 connected together, with the outer keyways 110 of a beam 114 of one module 90 aligned with the outer keyways 110 of a beam 114 of another module 90. FIG. 25 shows three modules 94 connected together in a staggered pattern, with the beam 116 of one module 92 connected with beams 116 of two adjacent modules 92. The flexibility of this connection system enables different configurations of floating wetland structures to be built with the modules 90, 92.

While the invention has been described in conjunction with a limited number of embodiments, it will be appreciated by those skilled in the art that many alternatives, modifications and variations in light of the foregoing description are possible. Accordingly, the present invention is intended to embrace all such alternatives, modifications and variations as may fall within the spirit and scope of the invention as disclosed.

Any reference herein to a patent document or other matter which is given as prior art is not to be taken as an admission that that document or matter was known or that the information it contains was part of the common general knowledge as at the priority date of any of the claims.

The claims defining the invention are as follows:

1. A floating wetland structure including:
a plurality of floating connected modules, each module having a frame that is at least partially hollow to provide buoyancy to the module and is adapted to support a medium for growing plants in the wetland, wherein each module includes an opening to allow ingress of fluid into the frame to enable buoyancy of the module to be regulated, wherein the frame of each module includes a plurality of hollow beams that integrally form the frame and wherein the frame of each module is adapted to support one or more containers for growing plants in the wetland, wherein each beam includes one or more outer keyways for connecting the beam to a beam of an adjacent module.

2. A floating wetland structure according to claim 1 wherein each beam includes one or more protrusions for aligning the beam to a beam of an adjacent module and preventing movement once a key is inserted into an outer keyway of the beam.

3. A floating wetland structure according to claim 1, wherein each module is constructed from UV stabilised high or low-density polyethylene (HDPE, LDPE).

4. A floating wetland structure according to claim 1, further including one or more platforms adapted to be supportable by the frame.

5. A floating wetland structure according to claim 1, wherein the modules are connected in a grid pattern.

6. A floating wetland structure according to claim 1, wherein the modules are connected in a staggered pattern.

* * * * *